Patented Sept. 2, 1952

2,609,323

UNITED STATES PATENT OFFICE 2,609,323

ALKYL VANILLATE OINTMENT

Irwin A. Pearl, Appleton, Wis., assignor, by mesne assignments, to Sulphite Products Corporation, Appleton, Wis., a corporation of Wisconsin No Drawing. Application March 23, 1948, Serial No. 16,609

5 Claims. (Cl. 167—63)

The present invention relates to therapeutic preparations and more particularly to therapeutically active ointments for combatting dermatophytic (ringworm or fungal) type infections.

The art has been searching for many years for improved preparations for use in the treatment of dermatophytosis. The need for improved preparations became particularly critical during World War II when a relatively large number of troops were found to be infected with ringworm of the scalp, thighs and body as well as the well known "athlete's foot" type of infection of the feet. With the return of infected troops the critical need for improved preparations has continued and particularly so as certain "jungle rot" type of infections were found to be resistant to available preparations.

Investigations in this field have for the most part met with failure either because the chemical products tested proved ineffective on ringworm type of infections or because the products themselves proved to be irritating, developed allergies or in certain instances severe cases of dermatitis. The ideal composition in addition to being effective against ringworm infections should also be substantially nontoxic to animals as used and free from all undesirable side reactions.

I have discovered that esters of vanillic acid and particularly the lower alkyl vanillates may be readily incorporated into ointments and that the resulting preparations are effective therapeutic products for combatting ringworm type infections. I have also discovered that these esters in which the ester (COO-alkyl) group is attached to a phenyl ring having a methoxy ($CH_3O$) group at the meta or 3-position and a hydroxy (OH) group at the para or 4-position are substantially free from undesired side reactions.

The following examples will serve to illustrate the present invention.

Example I 320 grams polyethylene glycol (Carbowax) of jelly type consistency with an average molecular weight of about 1500
40 grams polyethylene glycol (Carbowax) of a waxy type consistency with an average molecular weight of about 4000
40 grams ethyl vanillate The above ingredients are thoroughly mixed to provide a homogeneous composition by dissolving the ethyl vanillate in the melted mixture of polyethylene glycols and cooling. A few drops of a surface active wetting or penetrating agent such as "Tween 60" may be incorporated if desired in this or other compositions.

Example II 360 grams lanolin
40 grams propyl vanillate

This composition is prepared by compounding (mixing) the ingredients as in Example I.

Example III 360 grams vanishing cream base
40 grams ethyl vanillate

This composition is prepared by the compounding (efficient mixing) of the immiscible ointment base and vanillate.

In place of the alkyl vanillates employed in the above examples, other lower alkyl esters such as isopropyl vanillate; the n-butyl, isobutyl, secondary butyl and tertiary butyl vanillates; the amyl vanillates; the hexyl vanillates, etc., may be used. These esters may be prepared by reacting the esterifying alcohol with vanillic acid in accordance with the processes described in my co-pending application, Serial No. 597,145 filed June 1, 1945, now abandoned. The following example is illustrative:

*Ethyl vanillate.*—A mixture of about 1,000 grams of vanillic acid, 5000 cc. of ordinary ethanol and 200 cc. of sulfuric acid is heated to boiling under a reflux for about four hours and then distilled under reduced pressure (to remove excess ethanol) until the residue has a volume of about 1.5 liters. The residue is next poured with stirring into 8 liters of ice water and then neutralized with a slurry of sodium bicarbonate. The resulting granular percipitate is filtered, washed with water, dissolved in ether, the ether removed by distillation and the viscous, oily residue then distilled under reduced pressure at about 138° C./3 mm. Upon standing the ethyl vanillate is obtained as white crystals melting at about 43–44° C. Recrystallization from dilute ethanol gives colorless crystals of ethyl vanillate melting sharply at 44° C.

The other esters may be prepared in a similar manner by substituting the appropriate esterifying alcohol for ethanol. The n-propyl vanillate melts at 42–43° C.; the isopropyl vanillate melts at 112–113° C.; the n-butyl vanillate melts at 48–49° C.; the isobutyl vanillate melts at 56–57° C.; the secondary butyl vanillate melts at 73–74° C.; the n-amyl vanillate melts at 35–36° C.; the isoamyl vanillate melts at 61–62° C.; the n-hexyl vanillate obtained as an oil boils at 129–130° C./2 mm., etc. When incorporating the purified crystalline esters into an immiscible ointment base, they should be in finely powdered or pulverized form or in solution form as in concentrated alcoholic solution in order to insure homogeneous preparations.

The vehicle or ointment base may be any suitable water soluble or insoluble emollient type of carrier such as stearic acid base finishing or vanishing creams, cocoa butter, petrolatum, mineral oil, vegetable oils such as olive oil, palm oil, or coconut oils and various other oleaginous materials or various mixtures thereof. In order to readily maintain the alkyl vanillate at the seat of the infection, it is generally preferred to employ a semi-solid base.

The proportion of alkyl vanillate present in the vehicle may vary over a wide range although for most purposes ointments containing about 5-15 per cent vanillate ester are generally employed. Compositions made up of about 10% alkyl vanillate as illustrated in the examples have given excellent results in treating *Tinea capitis, Tinea cruris, Tinea corporis* as well as typical dermatophytosis. The alkyl vanillate in any event should be present in sufficient concentrations to control and remove the infection and optimum amounts for any particular case may be readily ascertained by experimental test.

Clinical investigations with the alkyl vanillate ointments have demonstrated them to be effective against various types of ringworm infections including *Microsporum audouini, Microsporum lanosum, Epidermophyton inguinale, Trichophton gypseum* and the like including various strains found particularly resistant to preparations available heretofor. Investigations have also demonstrated the new ointments to be substantially nontoxic as used to animals (including humans), and to be free from irritating effects and other undesired side reactions.

It will be understood by those skilled in the art that the examples given above are for illustrative purposes only and that the present invention is not limited thereto. Various modifications falling within the scope of the invention are covered by the annexed claims.

I claim:
1. A therapeutic product made up of an ointment base and containing as its effective ingredient a lower alkyl vanillate.
2. A therapeutic product made up of an ointment base and containing as its effective ingredient ethyl vanillate.
3. A therapeutic product made up of a polyethylene glycol ointment base and containing as its effective ingredient about 10 per cent ethyl vanillate.
4. A therapeutic product made up of an ointment base and containing as its effective ingredient isobutyl vanillate.
5. A therapeutic product made up of an ointment base and containing as its effective ingredient secondary butyl vanillate.

IRWIN A. PEARL.

REFERENCES CITED

The following references are of record in the file of this patent:

UNITED STATES PATENTS

| Number | Name | Date |
|---|---|---|
| 1,627,342 | Sabalitscka | May 3, 1927 |
| 2,022,185 | Bruson | Nov. 26, 1935 |
| 2,290,710 | Rice | July 21, 1942 |

OTHER REFERENCES

Bereston, J. Invest. Dermatol., November 1947, pages 243 and 245.

Keeney, Bull. Johns Hopkins Hospital. December 1943, pages 479 to 480.

Kingery et al., Archives Dermatology and Syphilology, Volume 31 (1935), pages 452 to 460.

Underwood et al., J. A. M. A. February 2, 1946, Volume 130, Number 5, pages 249 to 256.

Food Industry, Volume 17, page 1173 (October 1945).